(12) United States Patent
Seeland et al.

(10) Patent No.: US 11,220,289 B2
(45) Date of Patent: Jan. 11, 2022

(54) METHOD FOR OPERATING A CONTROL UNIT OF A TRANSPORTATION VEHICLE AND TRANSPORTATION VEHICLE WITH A CONTROL UNIT FOR CARRYING OUT THE METHOD

(71) Applicant: VOLKSWAGEN AKTIENGESELLSCHAFT, Wolfsburg (DE)

(72) Inventors: Jana Seeland, Wolfsburg (DE); Christian Hopp, Wolfenbüttel (DE)

(73) Assignee: VOLKSWAGEN AKTIENGESELLSCHAFT

( * ) Notice: Subject to any disclaimer, the term of this patent is extended or adjusted under 35 U.S.C. 154(b) by 224 days.

(21) Appl. No.: 16/567,073

(22) Filed: Sep. 11, 2019

(65) Prior Publication Data
US 2020/0094872 A1    Mar. 26, 2020

(30) Foreign Application Priority Data
Sep. 21, 2018 (DE) ...................... 10 2018 216 103.8

(51) Int. Cl.
| | | |
|---|---|---|
| *B62D 6/00* | (2006.01) | |
| *B62D 5/04* | (2006.01) | |
| *B60K 5/04* | (2006.01) | |
| *B62D 15/02* | (2006.01) | |

(52) U.S. Cl.
CPC ................. *B62D 6/00* (2013.01); *B62D 5/04* (2013.01); *B62D 15/025* (2013.01)

(58) Field of Classification Search
CPC ... B62D 7/14; B62D 9/00; B62D 6/00; B62D 15/02; B62D 5/00; B60G 17/015; B60G 21/00; B60G 21/055; B60K 5/04
See application file for complete search history.

(56) References Cited

U.S. PATENT DOCUMENTS

| | | | |
|---|---|---|---|
| 8,700,229 B2 | 4/2014 | Seger | |
| 2009/0210113 A1* | 8/2009 | Auguet | B62D 7/159 701/42 |
| 2011/0015805 A1* | 1/2011 | Seger | B60W 30/18145 701/1 |
| 2016/0347348 A1 | 12/2016 | Lubischer et al. | |
| 2017/0274877 A1* | 9/2017 | Wou | B60T 8/1766 |
| 2018/0111621 A1* | 4/2018 | Buss | B62D 15/027 |

(Continued)

FOREIGN PATENT DOCUMENTS

| | | |
|---|---|---|
| DE | 10346146 A1 | 5/2004 |
| DE | 10323975 A1 | 1/2005 |

(Continued)

*Primary Examiner* — Tan Q Nguyen
(74) *Attorney, Agent, or Firm* — Barnes & Thornburg LLP

(57) ABSTRACT

A method for operating a transportation vehicle having a control unit for electrically actuating an electromechanical coupling unit of a steering system of the transportation vehicle, wherein the control unit actuates the coupling unit according to a steering wheel characteristic curve which forms a ratio between a wheel lock angle of wheels of the transportation vehicle and a steering wheel rotational angle which is assumed by a steering wheel of the transportation vehicle, wherein a normal steering wheel characteristic curve is made available as a standard setting of the steering wheel characteristic curve in the control unit.

16 Claims, 2 Drawing Sheets

(56) References Cited

U.S. PATENT DOCUMENTS

| | | | | |
|---|---|---|---|---|
| 2018/0154932 A1* | 6/2018 | Rakouth | ................ | B62D 1/286 |
| 2019/0210586 A1* | 7/2019 | Aizawa | .................... | B62D 5/04 |
| 2020/0377150 A1* | 12/2020 | Hidaka | ................ | B62D 5/0481 |

FOREIGN PATENT DOCUMENTS

| | | |
|---|---|---|
| DE | 102004037947 A1 | 3/2006 |
| DE | 102004038008 A1 | 3/2006 |
| DE | 102006023562 A1 | 11/2007 |
| DE | 102007035751 A1 | 1/2009 |
| DE | 102008003666 A1 | 7/2009 |
| DE | 102015004745 A1 | 10/2016 |
| DE | 102017124375 A1 | 4/2018 |
| DE | 102017128739 A1 | 6/2018 |
| EP | 2460712 A2 | 6/2012 |
| WO | 2018163456 A1 | 9/2018 |

* cited by examiner

METHOD FOR OPERATING A CONTROL UNIT OF A TRANSPORTATION VEHICLE AND TRANSPORTATION VEHICLE WITH A CONTROL UNIT FOR CARRYING OUT THE METHOD

PRIORITY CLAIM

This patent application claims priority to German Patent Application No. 10 2018 216 103.8, filed 21 Sep. 2018, the disclosure of which is incorporated herein by reference in its entirety.

SUMMARY

Illustrative embodiments relate to a method for operating a control unit of a transportation vehicle and to a transportation vehicle having the control unit which is configured to carry out such a method.

BRIEF DESCRIPTION OF THE DRAWINGS

Exemplary embodiments are described below with response to the drawing, in which.

DETAILED DESCRIPTION

Figure 1:
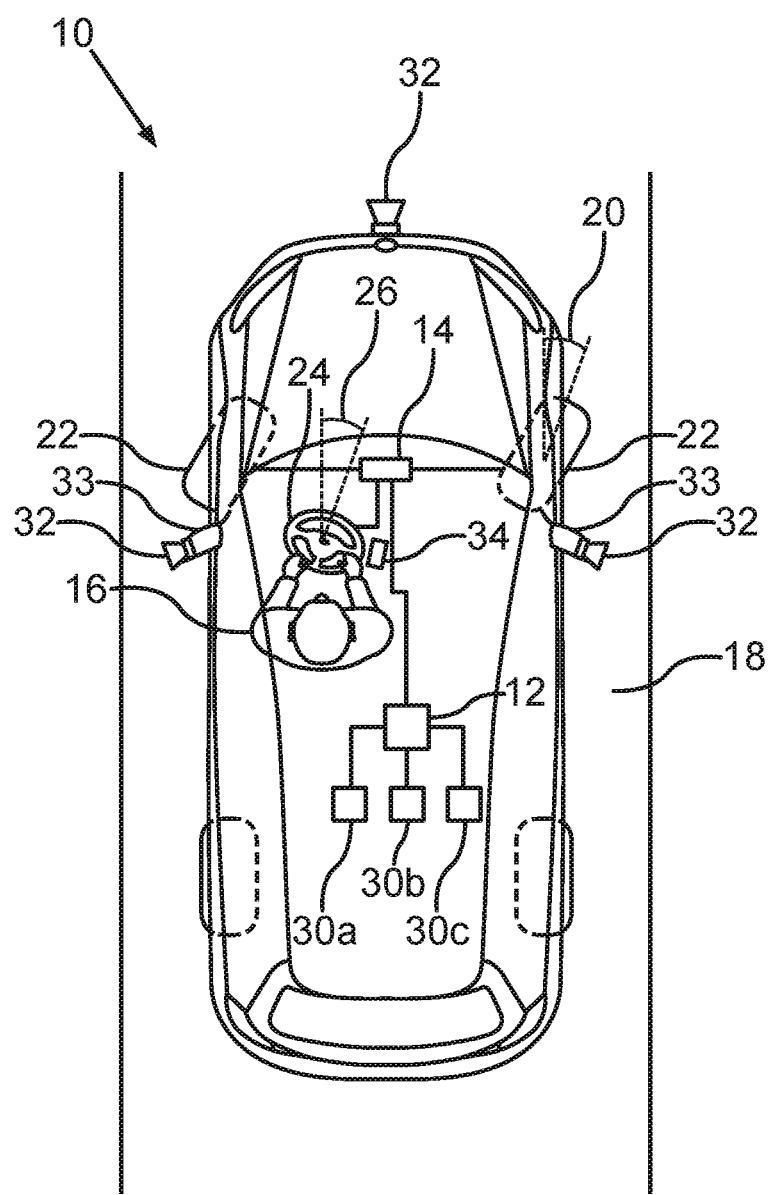
FIG. 1 shows a schematic plan view of a transportation vehicle having a control unit for electrically actuating an electromechanical coupling unit of a steering system of the transportation vehicle.

Transportation vehicles frequently have a control unit for electrically actuating an electromechanical coupling unit of a steering system of the transportation vehicle. They therefore have what is referred to as steer-by-wire technology. If a driver assistance system for autonomously steering the transportation vehicle is activated in such a transportation vehicle, a steering lock angle of wheels of the transportation vehicle is generally transmitted to the steering wheel of the transportation vehicle according to a steering wheel characteristic curve stored in the coupling unit, so that the steering wheel assumes a predefined steering wheel rotational angle which corresponds to the steering lock angle. This automatic rotational movement of the steering wheel can, however, be surprising and/or unpleasant for a user of the transportation vehicle.

US 2016/0347348 A1 describes a steering wheel system in which a steering wheel can move between two steering wheel positions in the transportation vehicle, wherein a fixed and a retracted steering wheel position are differentiated from one another. This steering wheel system is configured to make available an electrical coupling between the steering wheel and the steering axle on the basis of the steer-by-wire technology.

DE 10 2007 035 751 A1 describes a device and a method for engaging in a steering system with an active steering device. Within the scope of the method it is possible to detect an emergency situation, for example, from the fact that an airbag in the transportation vehicle is triggered, in response to which a control device can perform a steering intervention by the active steering device, to reduce the consequences of a possible impact of the transportation vehicle owing to the emergency situation. In addition, with the method a parking system is proposed in which the steering angle which is necessary for parking is set with the active steering device. In this context, an active steering intervention can be made possible by the active steering device independently of a driver of the transportation vehicle.

DE 10 2015 004 745 A1 describes a method for operating a transportation vehicle. A steering angle of the wheel of the transportation vehicle is not transmitted directly to a steering wheel here but instead can be uncoupled from the wheel. There is provision, for example, that in the case of freeway driving the steering angle is reduced significantly compared to town driving. The ratio between the rotational movement of the steering wheel and the steering angle which is actually set can additionally be defined as a function of the actual speed of the transportation vehicle.

EP 2 460 712 B1 describes a method for operating a transportation vehicle. Within the scope of the method, in this context firstly an object in the surroundings of the transportation vehicle is sensed and it is evaluated whether there is risk of a collision of the transportation vehicle with this object. A steering angle of the transportation vehicle is adjusted in accordance with this evaluation, wherein a degree of uncoupling of the steering angle from a wheel lock angle is dependent on a speed of the adjustment of the steering angle and increases as the speed of the adjustment increases. As a result, a greatly reduced rotational movement of the steering wheel becomes possible even in the case of dynamic and automatic emergency avoidance maneuvers.

The described systems and methods propose a change in the steering wheel characteristic curve of a transportation vehicle in a hazardous situation, that is to say when what are referred to as emergency functions intervene, as well as in accordance with the current surroundings of the transportation vehicle, such as, for example, the type of road or the actual speed of the transportation vehicle. However, these changes in the steering wheel characteristic curve are not evident to the user of the transportation vehicle, since the user has no influence on the changes in the steering wheel characteristic curve or even feels overpowered and surprised by these changes.

Disclosed embodiments make available a solution with which a steering characteristic curve of a transportation vehicle can be planned in a way which is evident to the user of the transportation vehicle.

This is achieved by a method for operating a transportation vehicle and by a transportation vehicle.

The disclosed method for operating a control unit of a transportation vehicle is provided for a transportation vehicle which has a control unit for electrically actuating an electromechanical coupling unit of a steering system of the transportation vehicle, wherein the control unit actuates the coupling unit according to a steering wheel characteristic curve which forms a ratio between a wheel lock angle of wheels of the transportation vehicle and a steering wheel rotational angle which is assumed by a steering wheel of the transportation vehicle. The method is therefore configured to operate a transportation vehicle which has steer-by-wire technology. The steering wheel rotational angle therefore defines a wheel position, that is to say the wheel lock angle of the wheels of the transportation vehicle, with respect to a longitudinal axis of the transportation vehicle, and vice-versa. A normal steering wheel characteristic curve is made available in the control unit of the transportation vehicle as a standard setting of the steering wheel characteristic curve. Within the scope of the disclosed method it is therefore assumed that to steer the transportation vehicle the transportation vehicle is firstly actuated with the control unit according to the normal steering wheel characteristic curve. This initial state is defined, for example, in that a driver assistance system which is currently accessing the steering system of the transportation vehicle is not activated in the transportation vehicle, and a user of the transportation vehicle steers the transportation vehicle manually by a movement of the steering wheel. The wheel lock angle of the wheels of the transportation vehicle is set here according to the normal steering wheel characteristic curve in accordance with the steering wheel rotational angle which is assumed by the steering wheel, by the corresponding actuation of the coupling unit.

The disclosed method for operating the control unit comprises the following operations: firstly a potentially upcoming situation of the transportation vehicle is detected on the basis of data which characterize a state of a driver assistance system of the transportation vehicle and are received by the control unit. The potentially upcoming situation can be, for example, a parking maneuver of a transportation vehicle. This "parking" situation can be detected, for example, on the basis of data of a parking assistant of the transportation vehicle. This detection occurs, for example, by virtue of the fact that the user of the transportation vehicle has activated the parking assistant manually by an activation device, provided for this purpose, of a display device or a pushbutton key in the interior of the transportation vehicle. The parking assistant is controlled by a control device which is an electronic device of the transportation vehicle, so that the state of the activated parking assistant is known to the control unit on the basis of the data which characterize the state of this electronic device and are made available to the control unit.

In a subsequent method operation it is checked whether the detected situation is assigned a special steering wheel characteristic curve which is made available in the control unit and which deviates from the normal steering wheel characteristic curve. In this second operation it is therefore detected whether, for example, for the "parking" situation a steering wheel characteristic curve which is provided for precisely this potentially upcoming situation, this being the so-called special steering wheel characteristic curve for the "parking" situation, is stored in the control unit. A plurality of such special steering wheel characteristic curves which are each provided for different potentially upcoming situations can be made available in the control unit of the transportation vehicle.

If the special steering wheel characteristic curve which is made available can then be assigned to the detected situation, this special steering wheel characteristic curve is activated. The special steering wheel characteristic curve can be configured in this example that is to say in the potentially upcoming "parking" situation in such a way that a steering wheel rotational movement, that is to say the steering rotational angle which is assumed by the steering wheel of the transportation vehicle, is reduced in comparison with the normal steering wheel characteristic curve at the same wheel lock angle of the wheels of the transportation vehicle, for example, to only 80% of the steering wheel angle according to the normal steering wheel characteristic curve. The activation of the special steering wheel characteristic curve occurs automatically in this case. However, it is also alternatively possible to provide that the user of the transportation vehicle activates the special steering wheel characteristic curve manually, which he is incited to do, for example, by a display on the display device in the interior of the transportation vehicle.

The disclosed method permits adaptation of the steering wheel characteristic curve to take place early, to be precise as early as when the potentially upcoming situation of the transportation vehicle has been detected but the transportation vehicle is not yet necessarily actually in this situation. This is because the potentially upcoming situation in which an alternative steering wheel characteristic curve could be appropriate can be detected on the basis of a state of a driver assistance system of the transportation vehicle. Since such a driver assistance system must often firstly be activated by the user of the transportation vehicle, the occurring activation of the special steering wheel characteristic curve is configured in a way which is evident to the user. In addition, the described detection of the potentially upcoming situation also extends beyond the selection of the special steering wheel characteristic curve merely on the basis of determining the location of the transportation vehicle, such as is provided, for example, in DE 10 2015 004 745 A1, in which a type of road is taken into account in the selection of the steering wheel characteristic curve. In each document, the selected steering wheel characteristic curve is additionally defined on the basis of the actual speed of the transportation vehicle. However, with the disclosed method the potentially upcoming situation is detected on the basis of the data which characterize the state of the driver assistance system of the transportation vehicle. The described data characterize the state of a driver assistance system and therefore contain information as to whether this driver assistance system is activated, whether it is activated and currently active with respect to the steering of the transportation vehicle, or whether it is deactivated.

The disclosure also encompasses other embodiments which provide additional benefits.

In at least one disclosed embodiment, there is provision that the received data contain information as to whether the driver assistance system of the transportation vehicle is activated, wherein the potentially upcoming situation of the transportation vehicle is detected on the basis of a type of the activated driver assistance system. If, for example, the parking assistant is activated manually by the user, a type of the driver assistance system, that is to say in this context the "driver assistance systems for parking the transportation vehicle" type is stored for this driver assistance system in the control unit. The activated parking assistant can therefore be linked directly to the potentially upcoming "parking" situation so that precisely this potentially upcoming situation is detected on the basis of the activated parking assistant. The corresponding driver assistance system may be activated manually by the user of the transportation vehicle here. However, it is alternatively or additionally possible for the corresponding driver assistance system to be activated automatically, for example, on the basis of corresponding signals of a sensor device of the transportation vehicle. Depending on the stored special steering wheel characteristic curve, the coupling of the steering wheel rotational angle and wheel lock angle can be reduced, increased or even completely suppressed here. The user of the transportation vehicle can, for example, allow his hands to rest on the steering wheel during an automatic parking process using the parking assistant without feeling disturbed by the movement of the steering wheel, since, depending on the special steering wheel characteristic curve which is selected, for example, only a reduced steering wheel movement, that is to say only reduced simultaneous rotation of the steering wheel occurs during the parking process with the parking assistant.

In a further disclosed embodiment, there is provision that if the received data contain information to the effect that the driver assistance system is activated but there is a predefined time offset with respect to engagement of the activated driver assistance system in the coupling unit of the steering system, this is taken into account in the checking as to whether a special steering wheel characteristic curve which is made available in the control unit is assigned to the situation which is detected on the basis of the type of the activated driver assistance system. The assigned special steering wheel characteristic curve is not activated until the activated driver assistance system engages in the coupling unit. If, for example, the user of the transportation vehicle activates a parking assistant which additionally comprises the function that it looks for a suitable parking space for the transportation vehicle while, for example, the user steers the transportation vehicle the transportation vehicle manually on a road, the parking assistant will not act actively on the steering of the transportation vehicle, that is to say intervene in the coupling unit, until the search for the parking space is successfully concluded and the transportation vehicle is actually parked in the parking space which has been found. With such an activated driver assistance system there is therefore a certain chronological offset between the activation of the driver assistance system by the user and the actual intervention of this driver assistance system in the coupling unit of the steering system. In the checking operation of the method, it is therefore detected in this example that a special steering wheel characteristic curve which is made available in the control unit can be assigned to the "parking" situation which is detected on the basis of the activated parking assistant. However, immediate activation of this special steering wheel characteristic curve, that is to say while the transportation vehicle is still searching for a parking space using the driver assistance system and at the same time as being steered by the driver according to the normal steering wheel characteristic curve, would not be sensible. Therefore, the special steering wheel characteristic curve which is assigned to the detected "parking" situation is not activated until the driver assistance system, that is to say the parking assistant, actually intervenes in the coupling unit, that is to say controls the steering system of the transportation vehicle during the parking of the transportation vehicle in the parking space which is found.

Analogous to this, when an emergency function, such as, for example, emergency assist or a lane keeping assistant, is activated, the special steering wheel characteristic curves which are, where appropriate, made available for the respective driver assistance system in the control unit is not activated until the respective driver assistance system actively intervenes in the coupling unit. The special steering characteristic curve is therefore not activated during the entire journey of the transportation vehicle, only because an emergency function, such as, for example, the emergency assist of the transportation vehicle, is activated during the entire journey. With the method, changing of the steering wheel characteristic curve from the normal steering wheel characteristic curve to the special steering wheel characteristic curve in a way which is evident to the user of the transportation vehicle can thus always be implemented with the method, independently of the activated driver assistance system.

Further disclosed embodiments provides that an overall situation of the transportation vehicle which comprises one of the following situations: parking of the transportation vehicle, coupling of a trailer to the transportation vehicle, maneuvering the transportation vehicle with a coupled trailer, driving the transportation vehicle on a predefined track, and the transportation vehicle making a turn, is detected as a potentially upcoming situation of the transportation vehicle.

The potentially upcoming situation is therefore defined as a situation which comprises maneuvering of the transportation vehicle and therefore relates to the entire transportation vehicle. In addition to the parking of the transportation vehicle which has already been mentioned and which can be detected, for example, on the basis of the activated parking assistant, further potentially upcoming situations are specified here, comprising, for example, coupling of a trailer or maneuvering of a transportation vehicle with a trailer, such as is possible, for example, by a trailer coupling assistant or a trailer maneuvering assistant. Alternatively or additionally, a situations which is suitable as a potentially upcoming situation is one in which the steering system of the transportation vehicle is accessed while the transportation vehicle is traveling, such as is the case, for example, by a lane keeping assistant or a turning off assistant. The specified situations which are detected as potentially upcoming situations are therefore respectively situations in which the transportation vehicle is steered at least partially autonomously but simultaneous rotation of the steering wheel occurs to correspond to the actuated wheel lock angle of the wheels. However, in all these situations it is pleasant for a driver of the transportation vehicle if the movement of the steering wheel is at least reduced to a measure which is comfortable and not hazardous for the user, or is even suppressed completely.

In a further disclosed embodiment there is provision that the received data are acquired by a sensor device of the transportation vehicle and the potentially upcoming situation of the transportation vehicle is detected on the basis of the data which are made available in such a way. In addition to the data which characterize a state of the electronic device of the transportation vehicle it is therefore also possible to have recourse to data of a sensor device of the transportation vehicle. This sensor device can be, for example, a camera system of the transportation vehicle, composed of one or more front-mounted cameras, side-mounted cameras and one or more rear-mounted cameras. By using this camera system it is possible, for example, to sense the surroundings of the transportation vehicle, so that, for example, the "parking" situation can be detected independently of an activated parking assistant if the camera system has, for example, sensed a parking space at the edge of the road. In addition to these camera data, for example, data which characterize the state of a flashing indicator light device of the transportation vehicle (direction of travel indicator) is accessed here, the device being one of the electronic devices of the transportation vehicle and being, for example, activated manually by the user to display an upcoming parking process. Additionally or alternatively, the state of a reversing process can be taken into account, that is to say data which indicate whether the reverse gear of the transportation vehicle is engaged or not.

By taking into account all these data, the sensor device and the status data of the flashing indicator light device and/or the reverse gear, the "parking" situation can be detected with a high probability only if this situation is actually potentially upcoming. This avoids a situation in which, for example, the special steering wheel characteristic curve for the "parking" situation is always activated after a random parking space has been traveled past, without the user planning or wishing to park the transportation vehicle. As a result, the detection of the potentially upcoming situation of the transportation vehicle becomes possible whenever a driver assistance system of the transportation vehicle is not actively activated by the user of the transportation vehicle. This is because in such a situation it may nevertheless be appropriate and, for example, may be desired by the user that a special steering wheel characteristic curve is activated, so that, for example, a small steering wheel rotation movement is sufficient to bring about a larger steering lock angle of the wheels than according to the normal steering wheel characteristic curve, which can make parking easier for the user of the transportation vehicle.

In a further disclosed embodiment there is provision that the received data contain a direction of travel of the transportation vehicle. If the user wishes, for example, that his transportation vehicle is parked in a parking space using the parking aid assistant, wherein the potentially upcoming "parking" situation is detected here on the basis of the activated parking assistant, a plurality of special steering wheel characteristic curves can be made available for the "parking" situation in the control unit. For example, one of the special steering wheel characteristic curves which is made available can be provided for forward travel of the transportation vehicle, and a second special steering wheel characteristic curve can be provided for reverse travel. Therefore, in addition to the data which characterize the state of the electronic devices of the transportation vehicle, the direction of travel of the transportation vehicle can be taken into account when detecting the potentially upcoming situation. This makes possible a steering wheel characteristic curve selection which is differentiated and even dependent on the specific situation during the potentially upcoming situation. For example, the rotational movement of the steering wheel can be reduced to a greater degree during reversing than is provided by the special steering wheel characteristic curve for forward travel when parking. Alternatively and/or additionally to this, it is possible, on the basis of corresponding received data, to take into account the rotational speed of the steering wheel and/or the actual speed of the transportation vehicle during the detection of the potentially upcoming situation.

A further disclosed embodiment provides that according to the special steering wheel characteristic curve the steering lock angle of the wheels of the transportation vehicle is decoupled from the steering wheel rotational angle which is assumed by the steering wheel, so that the steering wheel of the transportation vehicle remains unmoved during the actuation of the coupling unit of the steering system by the control unit. Complete uncoupling of the rotational movement of the steering wheel from the wheel lock of the wheels of the transportation vehicle is therefore possible. The steering wheel would therefore not move at all, for example, during an autonomous parking process using the parking assistant, while corresponding wheel lock angles of the wheels of the transportation vehicle which bring about parking are set by the control unit by a corresponding actuation of the coupling unit. Such a selection of the special steering wheel curve makes the steering of the transportation vehicle comfortable in the detected situation, since the user can, for example, place both of his hands on the steering wheel without being distracted, disturbed or, if appropriate, even injured by rotational movement of the steering wheel.

In a further disclosed embodiment, there is provision that the special steering wheel characteristic curve is configured in such a way that it can be selected and/or set by a user of the transportation vehicle by a predefined setting menu. The user of the transportation vehicle can therefore select, for example, using corresponding activation elements of a display device in the interior of the transportation vehicle, a setting menu in which he can select various steering wheel characteristic curves for, for example, predefined potentially upcoming situations. Alternatively or additionally to this, he can set these special steering wheel characteristic curves and the potentially upcoming situations, that is to say can compile corresponding special steering wheel characteristic curves and store them in the memory unit of the transportation vehicle. The user of the transportation vehicle can therefore determine, for example, that in the case of a piloted parking maneuver using the parking assistant he does not desire any movement whatsoever of the steering wheel, that is to say he can store a special steering wheel characteristic curve for the "parking" situation according to which the wheel setting angle of the wheels of the transportation vehicle is decoupled from the steering wheel rotational angle which is assumed by the steering wheel. In addition, the user can store in the control unit that when there is an activated parking steering assistant he would certainly like to move along with a rotational movement of the steering wheel, but this is to be suppressed in comparison with the normal steering wheel characteristic curve, that is to say relatively small steering wheel rotational angles are assumed at the same wheel lock angles. The user of the transportation vehicle can therefore apply individual configurations. They, for example, are stored linked to a detected key or to a detected cell phone of the user in the control unit. The user of the transportation vehicle therefore already knows in advance which change of the steering wheel characteristic curve he has to expect in which potentially upcoming situation so that he can track the changing of the normal steering wheel characteristic curve into one of the stored special steering wheel characteristic curves. This ensures that the user of the transportation vehicle can feel supported by the method during driving.

The special steering wheel characteristic curve can be embodied as a progressive steering wheel characteristic curve, that is to say as steering wheel characteristic curve which does not have a constant profile but rather, for example, rise to a greater extent at large wheel lock angles than at relatively small wheel lock angles. As a result, for example, an acute rise from the steering wheel rotational angle to the wheel lock angle can be set in a predefined wheel lock angle range. The desired profile of the special steering wheel characteristic curve can be selected and/or set by the user of the transportation vehicle by the predefined setting menu. In this context, the user of the transportation vehicle can select, for example, the desired profile of the special steering wheel characteristic curve from a selection of predefined special steering wheel characteristic curves, that is to say various configurations for special steering wheel characteristic curves are suggested to him, among which he can search for the desired configuration.

A further disclosed embodiment provides that the normal steering wheel characteristic curve is activated as soon as it is detected that the detected situation has ended. The special steering wheel characteristic curve is therefore active only for as long as the detected situation persists. For example, in the case of the "parking" situation, which is detected, for example, on the basis of the activated parking assistant, this situation is generally ended when the parking procedure ends and/or the parking assistant is deactivated. As soon as the respective signal for this ending and/or deactivation of the parking assistant of the control unit is made available, the steering wheel characteristic curve changes back to the normal steering wheel characteristic curve. Alternatively or additionally to this, it can be continuously interrogated whether the detected situation continues to be detectable, that is to say whether it continues to correspond to the current situation of the transportation vehicle. For this, for example, the current state of the parking assistant is interrogated by the control unit at predefined time intervals. Alternatively or additionally to this, the data which currently characterize the state of the electronic devices, and which therefore can be used to detect whether the situation has ended, can be made available by this electronic device of the control unit continuously or, if appropriate, only when there is a change in the state of the electronic device. In this way it can be ensured that the respective special steering wheel characteristic curve is activated only when the transportation vehicle is actually in the situation for which this special steering characteristic curve is provided.

The disclosed embodiments also makes available a control unit for a transportation vehicle. The control unit has a processor device which is configured to carry out an exemplary embodiment of the disclosed method.

The disclosed embodiments also include the control unit for the transportation vehicle. The control unit has a processor device which is configured to carry out an exemplary embodiment of the disclosed method. The processor device can for this purpose have at least one microprocessor and/or at least one microcontroller. Furthermore, the processor device can have program code which is configured to carry out the exemplary embodiment of the disclosed method when executed by the processor device. The program code can be stored in a data memory of the processor device.

According to the disclosed embodiments, a transportation vehicle having a control unit is furthermore provided, wherein the control unit is configured to electrically actuate an electromechanical coupling unit of a steering system of the transportation vehicle, and which has a processor device which is configured to carry out the method described above.

In the exemplary embodiment, the described components of the embodiment respectively illustrate individual features of the disclosure which are to be considered independently of one another and which each also develop the disclosure independently of one another and therefore are also to be considered components of the disclosure, either individually or in a combination other than that shown. Furthermore, the described embodiment can also be supplemented by further features of the disclosure which have already been described.

In the figures, functionally identical elements are each provided with the same reference symbols.

FIG. 1 is a sketch of a transportation vehicle 10 which has a control unit 12 for electrically actuating an electromechanical coupling unit 14 of a steering system of the transportation vehicle 10. In the transportation vehicle 10 there is a user 16 of the transportation vehicle 10, who is driving the transportation vehicle 10 on a road 18. The control unit 12 actuates the coupling unit 14 according to a steering wheel characteristic curve which forms a ratio between a wheel lock angle 20 of wheels 22 of the transportation vehicle 10 and a steering wheel rotational angle 26 which is assumed by a steering wheel 24 of the transportation vehicle 10. What is referred to as a normal steering wheel characteristic curve is made available as a steering wheel characteristic curve in the control unit 12. This normal steering wheel characteristic curve is activated first.

The transportation vehicle 10 additionally has a plurality of electronic devices 30, specifically a parking assistant 30a, a flashing indicator light device 30b and an evaluation unit 30c of a camera system of the transportation vehicle 10. This camera system comprises a plurality of cameras 32 which are sketched as sensor devices 32 in FIG. 1. Here, these are the camera 32 in the front region of the transportation vehicle 10 as well as cameras 32 which are integrated in the side mirror 33 of the transportation vehicle 10. The sensor devices 32 are therefore oriented in such a way that at least one area surrounding the transportation vehicle 10 before the transportation vehicle 10 and one behind the transportation vehicle 10 as well as to its respective sides can be detected in the region of wheels 22 of a front axle of a transportation vehicle 10.

The electronic devices 30a, 30b each provide the control unit 12 with data which characterize a state of the electronic devices 30a, 30b of the transportation vehicle 10. The evaluation unit 30c also provides the control unit 12 with data, specifically data which has been acquired by the sensor devices 32, that is to say the cameras 32, and on the basis of which it is possible to detect an overall situation of the transportation vehicle 10 (the transmission of data from the respective cameras 32 to the evaluation unit 30c is not sketched in FIG. 1).

The transportation vehicle 10 additionally has a display device 34 on which a setting menu for the user 16 of the transportation vehicle 10 can be displayed.

Figure 2:
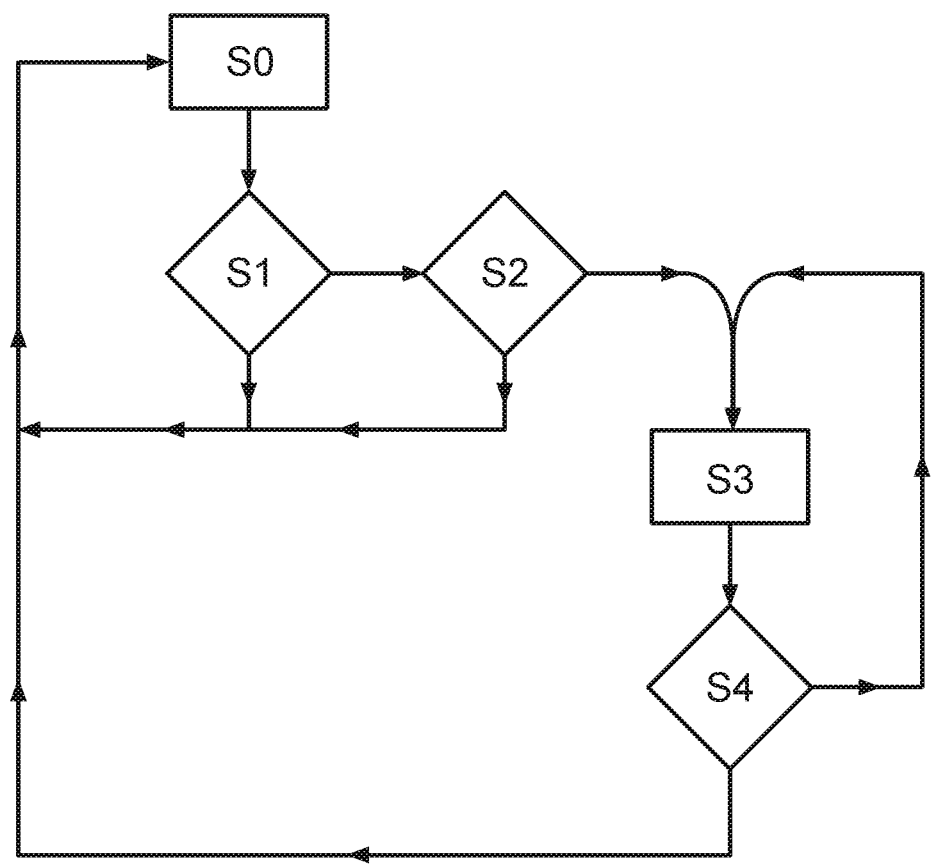
FIG. 2 shows a schematic illustration of a signal flow diagram for a method for operating a transportation vehicle.

FIG. 2 sketches the individual operations at S0 to S4 of a method for operating a transportation vehicle 10. In an initial state of the transportation vehicle 10, the normal steering wheel characteristic curve is made available in the control unit 12, so that according to the specifications of the normal steering wheel characteristic curve a ratio is formed between the wheel lock angle 20 and the steering wheel rotational angle 26. This initial state is sketched as operation at S0 in FIG. 2. In a first method operation at S1, a potentially upcoming situation of the transportation vehicle 10 is now detected on the basis of data which characterize a state of the electronic devices 30 of the transportation vehicle 10 and are received by the control unit 12. In this context, for example, one of the following situations can be detected: parking of the transportation vehicle 10, coupling of a trailer to the transportation vehicle 10, maneuvering of the transportation vehicle 10 with a coupled trailer, driving of the transportation vehicle 10 on a predefined lane of the road 18, turning off of the transportation vehicle 10.

The potentially upcoming situation is detected here on the basis of the received data, wherein the data can contain information as to whether a driver assistance system 30a, that is to say in this example the parking assistant 30a of the transportation vehicle 10, is activated. The potentially upcoming situation of the transportation vehicle 10 is detected here on the basis of a type of the activated driver assistance system 30a. The parking assistant 30a can be assigned, for example, as a type of driver assistance system 30a, to the "parking" type. The "parking" situation is detected in that the parking assistant 30a signals to the control unit 12 that this driver assistance system 30a is active. The received data can alternatively or additionally to this also be acquired by the sensor device 32 of the transportation vehicle 10, so that the situation of the transportation vehicle 10 is detected on the basis of the data which are made available in this way. For example, by using the sensor device 32 which transfers its data acquired by the cameras 32 to the evaluation unit 30c of the camera system it is possible, for example, to detect that the transportation vehicle 10 has stopped at the edge of the road 18, behind a point which is identified as a parking space. The data which are acquired by the sensor device 32 can alternatively be transferred directly to the control unit 12 or firstly pre-interpreted by the sensor device 32 itself, and the pre-interpreted data are subsequently transferred directly to the control unit 12. If data which contain information to the effect that the flashing indicator light of the transportation vehicle 10 has been activated on a corresponding side of the transportation vehicle are additionally made available to the control unit 12 on the basis of the flashing indicator light device 30b, the control unit 12 can infer from this that the "parking" situation is potentially upcoming. The received data can additionally or alternatively to this include a direction of travel and/or a gear change of the transportation vehicle 10.

In an operation at S2 it is then checked whether a special steering wheel characteristic curve which is made available in the control unit 12 and which deviates from the normal steering wheel characteristic curve is assigned to the detected situation. If no potentially upcoming situation has been detected or if it has been ascertained that there is no special steering wheel characteristic curve stored in the control unit 12 for a detected situation, the normal steering wheel characteristic curve remains activated and the method remains in operation at S0. If the special steering wheel characteristic curve which has been made available can be assigned to the detected situation, in operation at S3 activation of the special steering wheel characteristic curve takes place. From this point in time onward, the coupling unit 14 of the steering system of the transportation vehicle 10 is no longer actuated according to the normal steering wheel characteristic curve but rather according to the special steering wheel characteristic curve.

According to the special steering wheel characteristic curve there can be provision that the wheel lock angle 20 of the wheels 22 of the transportation vehicle 10 is uncoupled from the steering wheel rotational angle 26 which is assumed by the steering wheel 24, so that when the steering system is actuated by the control unit 12 the steering wheel 24 of the transportation vehicle 10 is unmoved. Alternatively to this, there can be provision as a special steering wheel characteristic curve that the ratio between the steering wheel rotational angle 26 and the wheel lock angle 20 is reduced, to be precise optionally to a degree which is comfortable and/or nonhazardous for the user 16. The user 16 can for this select and/or set the special steering wheel characteristic curve which he desires for a specific potentially upcoming situation, by the setting menu which can be displayed to him on the display device 34.

If the received data contain information to the effect that the driver assistance system 30a is activated but there is a predefined time offset up to engagement of the activated driver assistance system 30a in the coupling unit 14 of the steering system, this is taken into account during the checking as to whether a special steering wheel characteristic curve which is made available in the control unit 12 is assigned to the situation detected on the basis of the type of the activated driver assistance system 30a, that is to say in the operation at S2. The activation of the assigned special steering wheel characteristic curve does not take place until the activated driver assistance system 30a engages in the coupling unit 14. It is therefore also possible that firstly a parking space for the transportation vehicle 10 is searched for using the parking assistant 30a. During this time, the user 16 can, for example, continue to steer the transportation vehicle 10 manually. As soon as parking has occurred in this parking space in an assisted state, the parking assistant 30a however assumes the steering of the transportation vehicle 10. It is only from this moment on that it is provided that a special steering wheel characteristic curve which is stored for the "parking" situation is activated, that is to say the method operation at S3 is carried out. This is appropriate in the case of driver assistance systems 30a which engage as an emergency function in the steering of the transportation vehicle 10, such as, for example, an emergency assist or a lane keeping assistant.

As soon as it is detected that the detected situation has ended, for example, that the parking maneuver of the transportation vehicle 10 has taken place, the normal steering wheel characteristic curve is activated again in operation at S4. If it is, however, detected in a checking operation which checks whether the detected situation is still persisting or not, that this detected situation has not yet ended, the special steering wheel characteristic curve remains activated, that is to say operation at S3 also occurs.

Overall it is thus to be noted that the method for operating the transportation vehicle 10 firstly may provide a normal state of the transportation vehicle 10 in which the control unit 12 actuates the coupling unit 14 of the transportation vehicle 10 according to the normal steering wheel characteristic curve. In response to this, the potentially upcoming situation of the transportation vehicle 10 is detected, which situation can be ascertained, for example, on the basis of an activated driver assistance system 30a by the user 16 or on the basis of an intervention of an emergency function. In addition, the situation can be sensed and detected using the sensor device 32 of the transportation vehicle 10. This results in a change in the movement of the steering wheel, that is to say suppression or reduction of a steering wheel rotational angle 26 with the same wheel lock angle 20, or vice-versa. This change in the movement of the steering wheel occurs according to the settings of the user 16. Finally, after the ending of the known situation the steering is actuated again according to the normal steering wheel characteristic curve. Finally, as a result it is possible for the steering wheel characteristic curve to change into situations which can be tracked by the user 16, for example, after the activation of the driver assistance system 30a, such as, for example, the parking assistant 30a, an optical parking system or another parking assistant, the intervention of an emergency function with a large steering intervention and/or after the detection of a speed threshold value of the rotational movement of the steering wheel 24 and/or a direction of travel of the transportation vehicle 10.

LIST OF REFERENCE NUMBERS

10 Transportation vehicle
12 Control unit
14 Coupling unit
16 User
18 Road
20 Wheel lock angle
22 Wheel
24 Steering wheel
26 Steering wheel rotational angle
30 Electronic device
30a Driver assistance system
30b Flashing indicator device
30c Evaluation unit
32 Sensor device
33 Side mirror
34 Display device

The invention claimed is:

1. A transportation vehicle comprising:
an electromechanical coupling unit of a steering system;
a control unit configured to electrically actuate the electromechanical coupling unit of the steering system; and
a processor device configured to carry out a method wherein the control unit actuates the coupling unit according to a steering wheel characteristic curve which forms a mutual ratio between a wheel lock angle of wheels of the transportation vehicle and a steering wheel rotational angle which is assumed by a steering wheel of the transportation vehicle, wherein a normal steering wheel characteristic curve is made available as a standard setting of the steering wheel characteristic curve in the control unit, and the method includes:

detection of a potentially upcoming situation of the transportation vehicle based on data which characterize a state of the driver assistance system of the transportation vehicle and are received by the control unit;

checking whether the detected situation is assigned a special steering wheel characteristic curve which is made available in the control unit and deviates from the normal steering wheel characteristic curve; and activation of the special steering wheel characteristic curve in response to the special steering wheel characteristic curve which is made available being assigned to the detected situation, wherein the received data contain information as to whether the driver assistance system of the transportation vehicle is activated, wherein the potentially upcoming situation of the transportation vehicle is detected based on a type of the activated driver assistance system.

2. The transportation vehicle of claim 1, wherein, in response to the received data containing information to the effect that the driver assistance system being activated, taking into account any predefined time offset with respect to engagement of the activated driver assistance system in the coupling unit of the steering system as part of the checking whether the detected situation is assigned, and wherein the assigned special steering wheel characteristic curve is not activated until the activated driver assistance system engages in the coupling unit.

3. The transportation vehicle of claim 1, wherein an overall situation of the transportation vehicle which comprises one of the following situations:
  parking of the transportation vehicle,
  coupling of a trailer to the transportation vehicle,
  maneuvering the transportation vehicle with a coupled trailer,
  driving the transportation vehicle on a predefined track, and
  the transportation vehicle making a turn,
  is detected as a potentially upcoming situation of the transportation vehicle.

4. The transportation vehicle of claim 1, wherein the received data are made available by a sensor device of the transportation vehicle, and the potentially upcoming situation of the transportation vehicle is detected based on the data which are made available in this way.

5. The transportation vehicle of claim 1, wherein the received data contain a direction of travel of the transportation vehicle.

6. The transportation vehicle of claim 1, wherein, according to the special steering wheel characteristic curve the wheel lock angle of the wheels of the transportation vehicle is decoupled from the steering wheel rotational angle which is assumed by the steering wheel, so that the steering wheel of the transportation vehicle remains unmoved during the actuation of the coupling unit by the control unit.

7. The transportation vehicle of claim 1, wherein the special steering wheel characteristic curve is configured so that the special steering wheel characteristic curve is selected and/or set by a user of the transportation vehicle by a predefined setting menu.

8. The transportation vehicle of claim 1, wherein the normal steering wheel characteristic curve is activated as soon as it is detected that the detected situation has ended.

9. A method for operating a control unit of a transportation vehicle, wherein the control unit electrically actuates an electromechanical coupling unit of a steering system of the transportation vehicle, and wherein the control unit actuates the coupling unit according to a steering wheel characteristic curve which forms a mutual ratio between a wheel lock angle of wheels of the transportation vehicle and a steering wheel rotational angle which is assumed by a steering wheel of the transportation vehicle, wherein a normal steering wheel characteristic curve is made available as a standard setting of the steering wheel characteristic curve in the control unit, the method comprising:

detecting a potentially upcoming situation of the transportation vehicle based on data which characterize a state of the driver assistance system of the transportation vehicle and are received by the control unit;

checking whether the detected situation is assigned a special steering wheel characteristic curve which is made available in the control unit and deviates from the normal steering wheel characteristic curve;

activating the special steering wheel characteristic curve in response to the special steering wheel characteristic curve which is made available being assigned to the detected situation, wherein the received data contain information as to whether the driver assistance system of the transportation vehicle is activated, wherein the potentially upcoming situation of the transportation vehicle is detected based on a type of the activated driver assistance system.

10. The method of claim 9, wherein, in response to the received data containing information to the effect that the driver assistance system being activated, taking into account any predefined time offset with respect to engagement of the activated driver assistance system in the coupling unit of the steering system as part of the checking whether the detected situation is assigned, and wherein the assigned special steering wheel characteristic curve is not activated until the activated driver assistance system engages in the coupling unit.

11. The method of claim 9, wherein an overall situation of the transportation vehicle which comprises one of the following situations:
  parking of the transportation vehicle,
  coupling of a trailer to the transportation vehicle,
  maneuvering the transportation vehicle with a coupled trailer,
  driving the transportation vehicle on a predefined track, and
  the transportation vehicle making a turn,
  is detected as a potentially upcoming situation of the transportation vehicle.

12. The method of claim 9, wherein the received data are made available by a sensor device of the transportation vehicle, and the potentially upcoming situation of the transportation vehicle is detected based on the data which are made available in this way.

13. The method of claim 9, wherein the received data contain a direction of travel of the transportation vehicle.

14. The method of claim 9, wherein, according to the special steering wheel characteristic curve the wheel lock angle of the wheels of the transportation vehicle is decoupled from the steering wheel rotational angle which is assumed by the steering wheel, so that the steering wheel of the transportation vehicle remains unmoved during the actuation of the coupling unit by the control unit.

15. The method of claim 9, wherein the special steering wheel characteristic curve is configured so that the special steering wheel characteristic curve is selected and/or set by a user of the transportation vehicle by a predefined setting menu.

16. The method of claim 9, wherein the normal steering wheel characteristic curve is activated as soon as it is detected that the detected situation has ended.

\* \* \* \* \*